United States Patent [19]

Boffa et al.

[11] 4,006,146

[45] Feb. 1, 1977

[54] 5-AZA-7-THIADIBENZOCRYSENE DERIVATIVES

[75] Inventors: Gioacchino Boffa; Nicola Mazzaferro, both of Novara, Italy

[73] Assignee: Montedison Fibre S.p.A., Milan, Italy

[22] Filed: Jan. 10, 1975

[21] Appl. No.: 540,166

[30] Foreign Application Priority Data

Jan. 11, 1974 Italy .................................. 19331/74

[52] U.S. Cl. ............................ 260/272; 260/42.21; 260/278
[51] Int. Cl.$^2$ .......................................... C09B 5/02
[58] Field of Search ............................ 260/272, 278

[56] References Cited

FOREIGN PATENTS OR APPLICATIONS 869,691   8/1970   Italy

*Primary Examiner*—Paul M. Coughlan, Jr.

[57] ABSTRACT

A new class of heterocyclic compounds containing N and S in the basic skeleton and which are 5-aza-7-thiadibenzocrysene derivatives useful as dyes or as intermediates in the synthesis of dyes and pigments are disclosed, as well as a method of obtaining the same by reaction of o-aminothiophenol 2-hydroxy-1-azabenzanthrone or its derivatives.

3 Claims, No Drawings

5-aza-7-THIADIBENZOCRYSENE DERIVATIVES

THE PRIOR ART

No prior art disclosing the 5-aza-7-thiadibenzocrysene derivatives of this invention has been found.

THE PRESENT INVENTION

The invention provides new 5-aza-7-thiadibenzocrysene derivatives corresponding to general formula I:

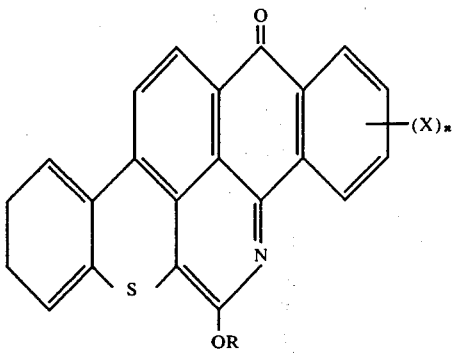

(6-alkoxy-14H-5-aza-7-thiadibenzo [b, def]crysene-14-one), wherein:
X = halogen or is absent
n = zero or, when halogen is present, 1.0
R = a lower alkyl radical The starting materials for the synthesis of such products are 2-hydroxy-1-azabenzanthrone or its derivatives which are halogen-substituted in the anthraquinonic ring (formula II) and o-aminothiophenol. The reaction proceeds according to the following scheme:

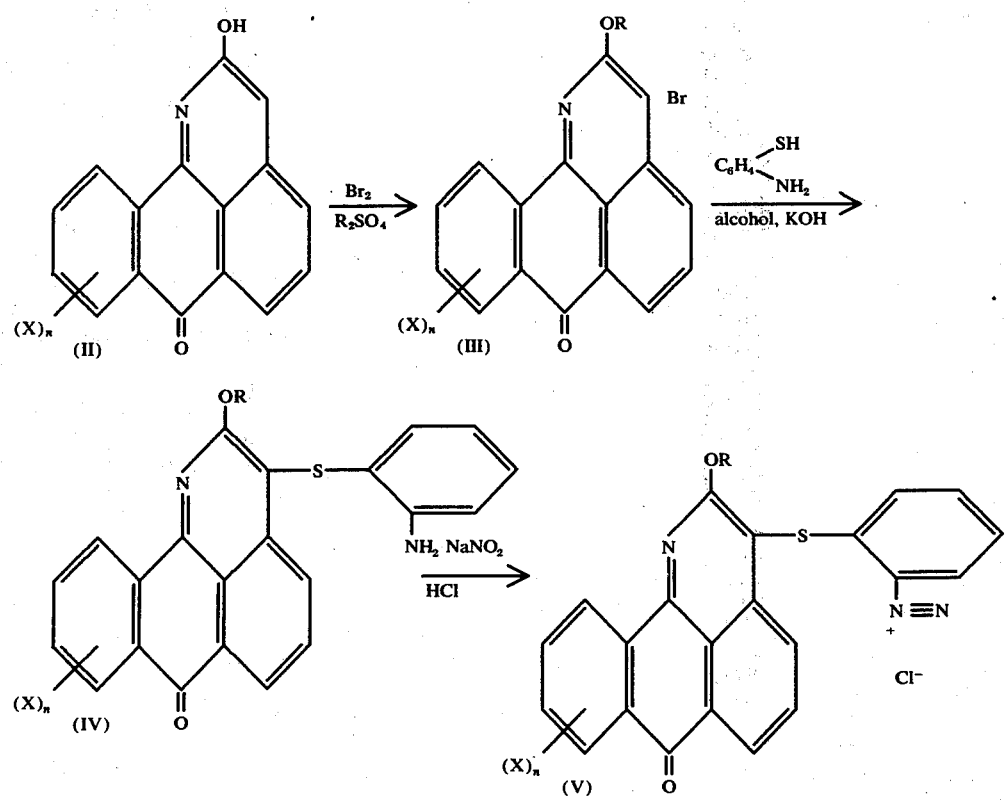

-continued

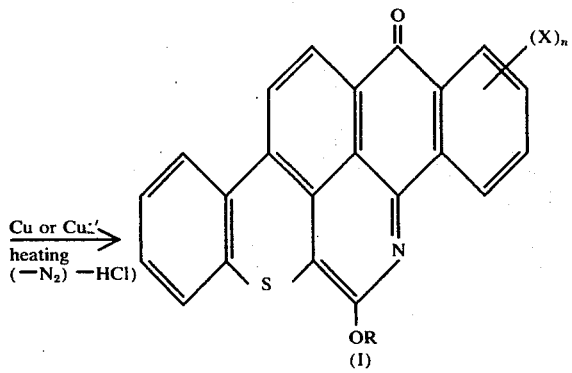

wherein X, n and R have the same above given meaning.

As is apparent from the schematic showing, the compounds of formula (II) are brominated on the 3-position by reaction with bromine in $H_2SO_4$, then alkylated with dialkylsulphate in DMF (dimethylformamide) in the presence of KOH, and thereafter condensed with o-aminothiophenol in pure alcohol and in the presence of KOH to obtain condensates of formula (IV).

The condensates thus obtained are diazotized with $NaNO_2$ and HCl in an inert solvent and the diazoic salts are then cyclized to formula (I) by heating in the presence of copper or copper salts.

The compounds of formula (I), when incorporated in plastic material such as, e.g., an acrylic resin, give rise to fluorescent violet dyes having excellent light fastness. Due to the presence of reactive sites in the molecule, products of formula (I) can be used as intermediates in the synthesis of dyes and pigments. For instance, a blue pigment is obtainable from one mole of the product of formula (I) in which X is chlorine and one mole of 1-amino-anthraquinone.

The following examples are given to illustrate the invention and are not intended to be limiting. Unless otherwise specified, the parts given in the examples are by weight.

EXAMPLE 1

Twenty parts of a compound of formula (III) (X=H; $R=CH_3$), obtained by bromination and methylation of a compound of formula (II) under the conditions disclosed in Italian Pat. No. 869,691, were heated under stirring for 12 hours with 17.5 parts of KOH, 34.2 parts of o-aminothiophenol and 800 volumes of ethyl alcohol. The precipitate obtained was filtered and crystallized from DMF to obtain 18 parts of a red powder melting at between 249° C and 250° C and corresponding to formula (IV) (X=H; $R=CH_3$).

Five parts of the red powder were diazotized in 250 ml of tetraglime (2,5,8,11,14-pentaoxapentadecane) at 0° – 5° C in one hour by the addition of 2 vols. of conc. HCL, 5 vols. of $H_2O$ and 0.9 parts of $NaNO_2$.

After the one-hour diazotization time, 4 parts of $CuSO_4.5\ H_2O$ were added, the mass was heated at 110° C to 115° C for three hours. After filtering, washing with dilute $HNO_3$ and methanol, there were obtained 4 parts of a product of formula (I) (X=H; $R=CH_3$). It was soluble in boiling n-dichlorobenzene with a strong orange fluorescence and crystallized from the solution in the form of violet crystals infusible at temperatures up to 300° C.

EXAMPLE 2

Eight parts of a yellow powder having m.p. 250° – 251° C and corresponding to formula (III) (X=8-Cl; $R=CH_3$), prepared under the conditions described in Italian Pat. No. 869,691, were reflux-heated for 12 hours with 11 parts of o-aminothiophenol, 6 parts of KOH and 270 vols. of ethanol. After filtering and crystallizing from DMF, 7 parts of a red powder of m.p. 248° – 249° C and having the structure (IV) (X=8-Cl; $R=CH_3$) were obtained.

Five parts of the red powder were then diazotized in 250 vols. of tetraglime at 0° – 5° C in 1 hour by the addition of a solution of 2 vols. of conc. HCl, 5 vols. of $H_2O$ and 0.9 parts of $NaNO_2$.

After the addition of 4 parts of $CuSO_4.5\ H_2O$ and heating at 110° – 115° C for 3 hours, filtering, washing with methanol and dilute $HNO_3$, 4 parts of a product of formula (I) (X=1-Cl, $R=CH_3$) were obtained. It was soluble in boiling o-dichlorobenzene with a strong orange fluorescence and crystallized from the solution as violet crystals infusible at temperatures up to 300° C.

EXAMPLE 3

0.02 g. of the pigment of Example 1 were pre-dispersed in and homogenized with polymethacrylate powder in a rotating ball mill for 48 hours. The homogenized powder was conditioned at 110° C for one night. Thereafter, it was extruded through an extruder the extruding head of which was maintained at a temperature between 190° and 220° C. The extruded material was granulated, dried carefully, and then molded in an injection press at a temperature comprised between 220° and 300° C.

The molded article, which was of a very deep fluorescent violet hue, was subjected to fastness tests according to UNI standards of the "Ente Nazionale Italiano Unificazione," which correspond to U.S. AATCC standards. It showed good general fastness properties and excellent light fastness.

The granulated material was subjected to thermostability tests by extruding it at 1 minute cycles at temperatures comprised between 220° and 300° C.

The color differences $\Delta E$, referred to a sample extruded for one minute at temperatures <220° C, were detected with a reflection spectrophotometer Datacolor 711 (Datacolor A.G. of Munich, Germany) and are expressed in N.B.S. units. The values found were as follows:

| | | |
|---|---|---|
| 220° C | — | — |
| 240° C | — | 1 |
| 260° C | — | 1.24 |
| 280° C | — | 1.67 |

The values found indicate that the product is particularly stable to heat.

The tone and fastness of the chloro-derivative are the same.

The results obtained by subjecting the pigment of Example 2 to the same tests were similar.

The preparation conditions of the product III are described in the Italian Pat. No. 869691 and may be summarized as follows.

The 2-hydroxy-1-azabenzanthrone or its substituted derivative (formula II) is brominated in concentrated $H_2SO_4$ at room temperature, which is then raised up to 40°–50° C for 3–5 hours.

The bromine-derivative is separated by pouring the reaction mass on ice, by filtering and washing until neutrality.

The doughy bromine-derivative is then reacted with excess dialkyl-sulphate in DMF at temperatures from 0° to 50° C in the presence of excess diluted alcaline hydroxide. The bromo-alkossi derivative (III) is filtered, dryed etc.

We claim:

1. As new compounds, 14H-5-aza-7-thiadibenzo-[b,def]crysenes corresponding to the general formula:

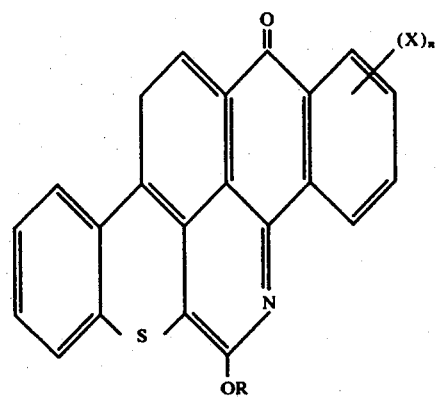

wherein:
X = chlorine
n = zero or 1.0
R = a lower alkyl radical

2. The compound according to claim 1, of formula:

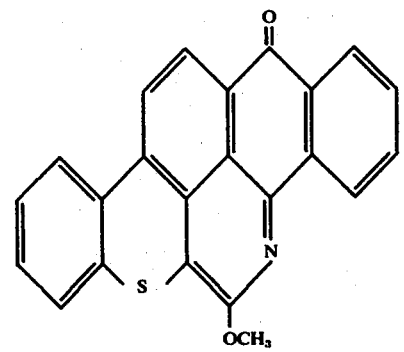

3. The compound according to claim 1, of formula:

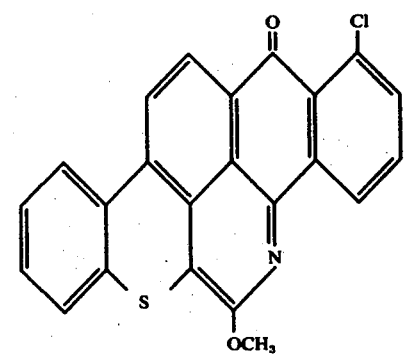

* * * * *

UNITED STATES PATENT OFFICE
CERTIFICATE OF CORRECTION

Patent No. 4,006,146     Dated February 1, 1977

Inventor(s) Gioacchino BOFFA et al

It is certified that error appears in the above-identified patent and that said Letters Patent are hereby corrected as shown below:

[73]    The assignee should be Montedison S.p.A., Milan, Italy

<u>Col. 3,</u>    the legend at the left-hand of the structural formula should read -

$$\xrightarrow[\text{heating}]{\text{Cu or Cu''}}$$

$(-N_2)$ $-HCl)$.

Signed and Sealed this

Twenty-eighth Day of February 1978

[SEAL]

Attest:

RUTH C. MASON      LUTRELLE F. PARKER
*Attesting Officer*      *Acting Commissioner of Patents and Trademarks*